(12) United States Patent
Huang

(10) Patent No.: US 8,104,560 B1
(45) Date of Patent: Jan. 31, 2012

(54) DRIVING DEVICE UTILIZING INERTIA

(75) Inventor: Teng-Hui Huang, Feng Yuan (TW)

(73) Assignee: Ting-Jung Tseng, Taoyuan County (TW)

( * ) Notice: Subject to any disclaimer, the term of this patent is extended or adjusted under 35 U.S.C. 154(b) by 0 days.

(21) Appl. No.: 12/944,747

(22) Filed: Nov. 12, 2010

(51) Int. Cl.
*B60K 6/00* (2007.10)

(52) U.S. Cl. ......................... 180/165; 180/337

(58) Field of Classification Search ............ 180/165, 180/65.1, 65.21, 65.31, 65.6, 337, 350, 357; 74/572.21

See application file for complete search history.

(56) References Cited

U.S. PATENT DOCUMENTS

| | | | | |
|---|---|---|---|---|
| 3,855,774 | A * | 12/1974 | Hurley | 57/81 |
| 3,861,485 | A * | 1/1975 | Busch | 180/65.7 |
| 3,882,950 | A * | 5/1975 | Strohlein | 180/165 |
| 3,952,589 | A * | 4/1976 | Geul | 73/116.06 |
| 4,098,144 | A * | 7/1978 | Besel et al. | 74/661 |
| 4,218,624 | A * | 8/1980 | Schiavone | 290/45 |
| 4,233,858 | A * | 11/1980 | Rowlett | 475/5 |
| 4,298,082 | A * | 11/1981 | Ramos | 180/65.8 |
| 4,423,794 | A * | 1/1984 | Beck | 180/165 |
| 4,532,769 | A * | 8/1985 | Vestermark | 60/698 |
| 4,588,040 | A * | 5/1986 | Albright et al. | 180/165 |
| 4,779,485 | A * | 10/1988 | Dollison et al. | 74/661 |
| 5,120,282 | A * | 6/1992 | Fjallstrom | 475/5 |
| 5,214,358 | A * | 5/1993 | Marshall | 318/139 |
| 5,215,156 | A * | 6/1993 | Stulbach et al. | 180/65.31 |
| 6,232,743 | B1 * | 5/2001 | Nakanishi | 320/104 |
| 6,962,223 | B2 * | 11/2005 | Berbari | 180/165 |
| 7,736,266 | B2 * | 6/2010 | Huang et al. | 477/3 |
| 7,748,214 | B2 * | 7/2010 | Ishii et al. | 60/295 |
| 2004/0262062 | A1 * | 12/2004 | Berbari | 180/165 |
| 2005/0248321 | A1 * | 11/2005 | Liu et al. | 322/4 |
| 2007/0095587 | A1 * | 5/2007 | DuCharme | 180/65.3 |
| 2007/0120430 | A1 * | 5/2007 | Kurosawa | 310/74 |
| 2007/0163828 | A1 * | 7/2007 | Manganaro | 180/165 |
| 2008/0054827 | A1 * | 3/2008 | States et al. | 318/108 |
| 2008/0272717 | A1 * | 11/2008 | Gleason et al. | 318/139 |
| 2009/0000836 | A1 * | 1/2009 | Kydd | 180/65.2 |
| 2009/0197715 | A1 * | 8/2009 | Yang | 474/12 |
| 2009/0197716 | A1 * | 8/2009 | Yang | 474/12 |
| 2010/0083790 | A1 * | 4/2010 | Graney et al. | 74/572.21 |
| 2010/0133032 | A1 * | 6/2010 | Jeong et al. | 180/165 |

* cited by examiner

*Primary Examiner* — J. Allen Shriver, II
*Assistant Examiner* — Brodie Follman
(74) *Attorney, Agent, or Firm* — Leong C. Lei

(57) ABSTRACT

The driving device utilizing inertia mainly contains a battery, a motor, a flywheel, a casing, a transmission box, a casing, a generator, a rectifier, and a charger. The flywheel is mounted on a shaft and is housed in a vacuum chamber through shaft seal. The flywheel freely spins by itself after actuated by the motor. The flywheel's torque is then delivered to the transmission box which in turn delivers the torque to drive a vehicle such as automobile, vessel, plane, submarine, etc. On the other hand, the spinning flywheel drives the generator to produce electricity which is stored in the battery series-connected to the generator via the rectifier and the charger. As such, the driving device is able to power the vehicle while the surplus energy is stored in the battery for activating the motor and turning the flywheel to spin.

2 Claims, 2 Drawing Sheets

DRIVING DEVICE UTILIZING INERTIA

TECHNICAL FIELD OF THE INVENTION

The present invention generally relates to a driving device to power vehicles such as automobiles, vessels, planes, submarines, etc., and more particular to a driving device utilizing a flywheel to drive a vehicle while surplus energy is stored in a battery for later starting a motor to spin the flywheel.

DESCRIPTION OF THE PRIOR ART

Vehicles such as automobiles, vessels, planes, using internal combustion engines and burning fossil fuel inevitably would produce a large amount of $CO_2$. The concern over environment protection, together with the soaring oil pricing, pushes people to seek alternative energy sources. Even though there are some exciting developments in "green" vehicles, they are mostly still in a preliminary stage and are costly to produce and to own. Hybrid automobiles integrating both internal combustion engine and electrical motor are a more practical approach to avoid the incomplete burning problem of engines running at a low speed by substitution with a motor driving. When the hybrid automobile has reached a specific speed or temperature, the hybrid automobile is switched to utilize the internal combustion engine, and the battery for starting the motor is charged. However, the hybrid automobiles are complex and costly to build, and are still dependent on the use of fossil fuel to a great extent.

SUMMARY OF THE INVENTION

Therefore, a novel driving device is provided herein. The gist of the present invention is to utilize inertia as a source of power and, by installing the present invention on vehicles such as automobiles, vessels, planes, submarines, etc., these vehicles are powered without burning fossil fuel and using internal combustion engines.

The driving device utilizing inertia mainly contains a battery, a motor, a flywheel, a casing, a transmission box, a casing, a generator, a rectifier, and a charger. The flywheel is housed in a vacuum chamber and freely spins by itself after actuated by the motor. The flywheel's torque is then delivered to the transmission box which in turn delivers the torque to drive the vehicle. As such, the driving device achieves significant energy saving and is entirely environmentally friendly.

On the other hand, the spinning flywheel drives the generator to produce electricity which is stored in the battery series-connected to the generator via the rectifier and the charger. As such, the driving device is able to power the vehicle while the surplus energy is stored in the battery for activating the motor and turning the flywheel to spin. Again, great energy saving is as such achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
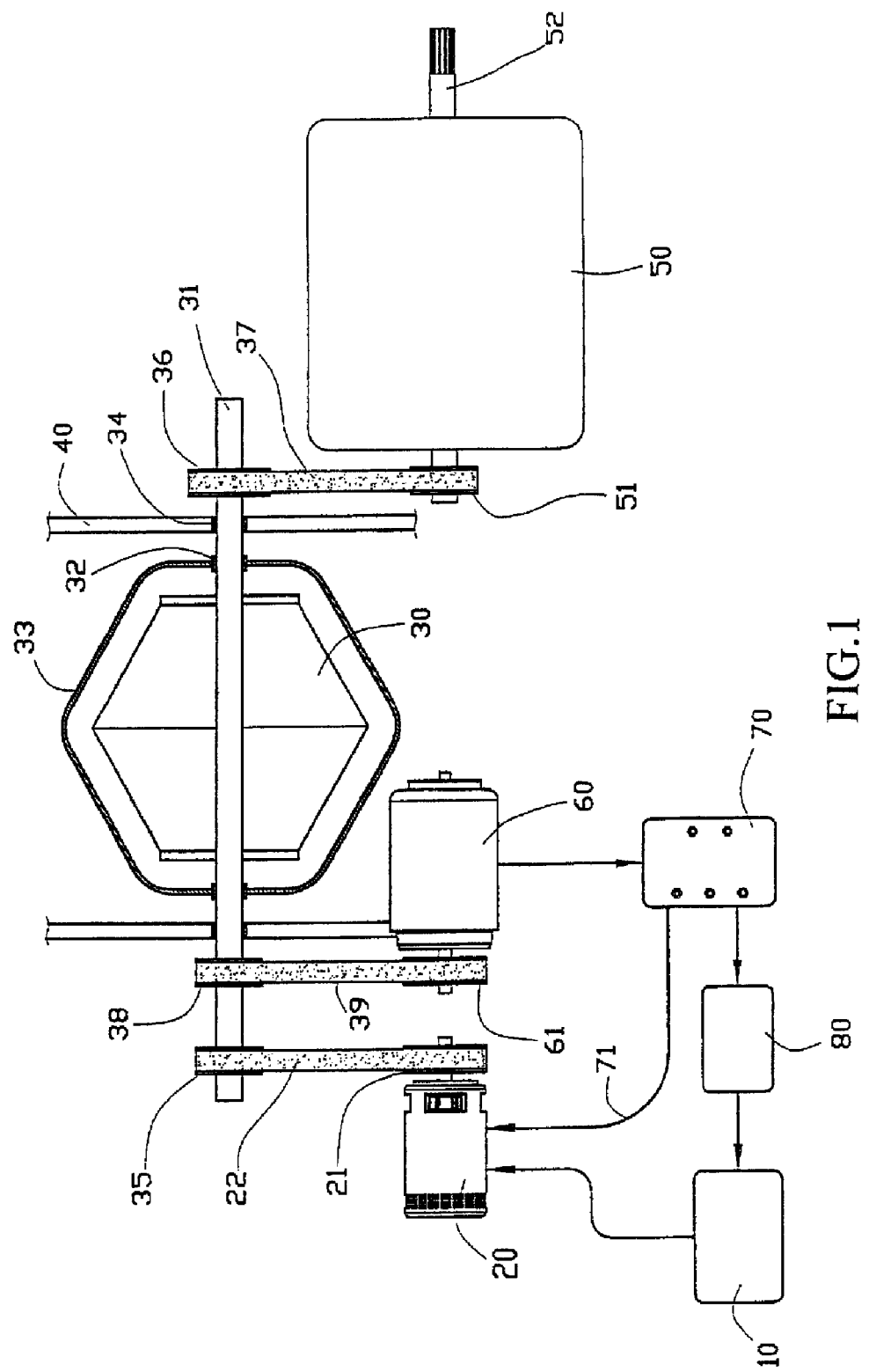
FIG. 1 is a schematic diagram showing the various components of a driving device utilizing inertia according to an embodiment of the present invention.
Figure 2:
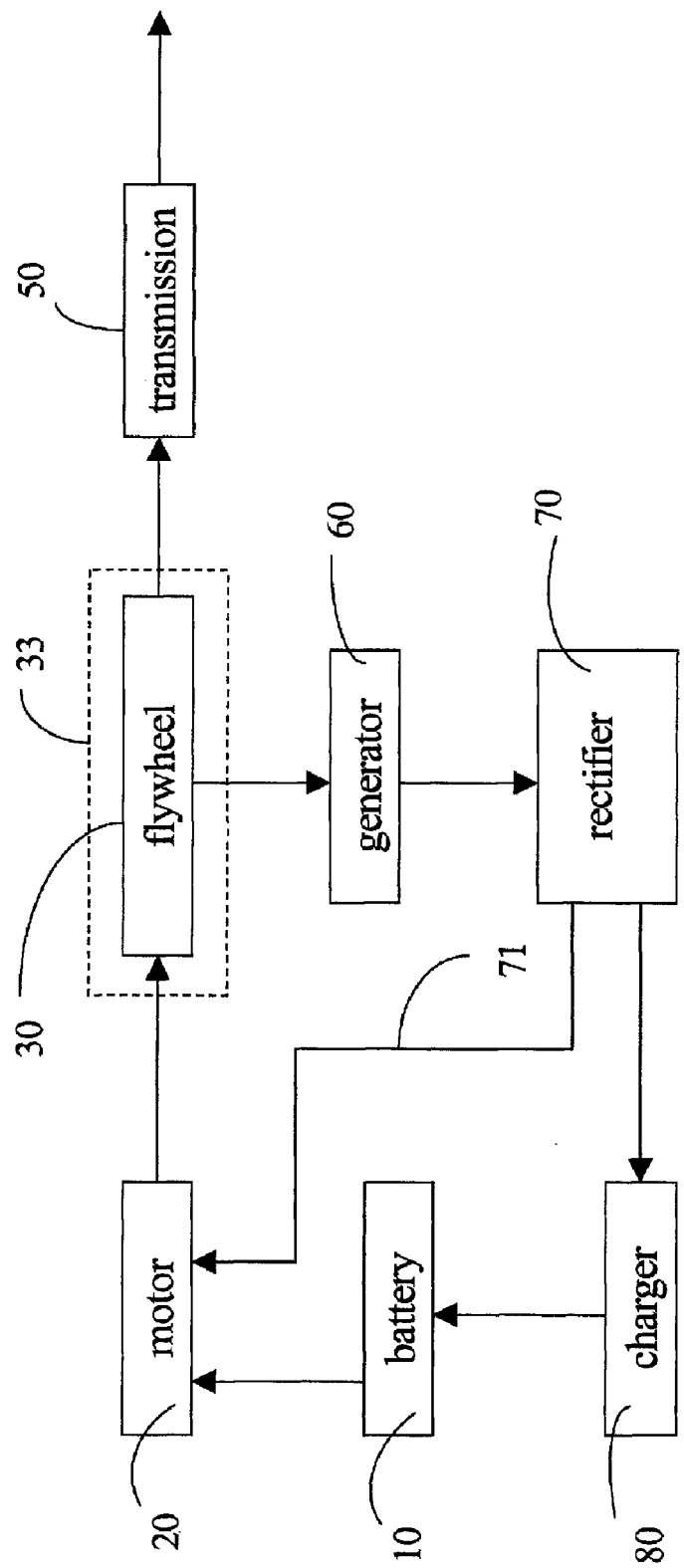
FIG. 2 is a block diagram showing the interaction of the major functional components of the driving device utilizing inertia of FIG. 1.

As shown in FIGS. 1 and 2, a driving device utilizing inertia according to an embodiment of the present invention mainly contains a battery 10, a motor 20, a flywheel 30, a casing 40, a transmission box 50, a generator 60, a rectifier 70, and a charger 80. The driving device could be applied on various motor vehicles such as automobiles, vessels, planes, submarines, etc. where they are self-powered by the driving device.

The battery 10 provides the required electricity to start the motor 20. The battery 10 is connected to and charged by the charger 80 which draws its electricity from the generator 60 through the rectifier 70.

The motor 20 engages a first shaft 31 of the flywheel 30 through a first wheel 21 and a belt 22 so as to continuously spin the flywheel 30.

The flywheel 30 is configured to have two conic shapes at two opposite ends, and is housed in a vacuum chamber 33. The first shaft 31 runs through the flywheel 30 and the vacuum chamber 33, and shaft seals 32 are used to secure the air-tightness of the vacuum chamber 33. The flywheel 30 therefore could freely spin inside the vacuum chamber 33. The first shaft 31 then runs across the casing 40 through bearings 34. The shaft 31 is engaged to spin by the motor 20 through a fourth wheel 35, and the torque produced is delivered to the transmission box 50 through a belt 37 and a sixth wheel 36, and to the generator 60 through another belt 39 and a fifth wheel 38. The bearings 34 could be hydrostatic bearings, hydrodynamic bearings, magnetic levitation bearings, or non-contact bearings.

The transmission box 50 receives torque from the flywheel 30 through a third wheel 51. Then, the transmission box 50 delivers the torque after speed change to drive a vehicle such as automobile, vessel, plane, submarine, etc. through a second shaft 52.

The generator 60 receives torque from the flywheel 30 through a second wheel 61 so as to continuously produce electricity. The generator 60, the rectifier 70, the charger 80, and the battery 10 are series-connected in this order so that the battery 10 is charged by the generator 60.

The rectifier 70, as described, is series-connected between the generator 60 and the charger 80 so as to store the electrical power from the generator 60 into the battery 10. On the other hand, the rectifier 70 is also connected to the motor 20 by a power cable 71 so as to provide electricity to the motor 20.

As described, the driving device could be installed on a vehicle so that the vehicle is self-powered without burning fossil fuel and without producing any $CO_2$. The driving device therefore is extremely helpful for environmental protection.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A driving device utilizing inertia for a vehicle, comprising a battery, a motor, a flywheel, a transmission box, a generator, and a rectifier, and a charger wherein said battery stores electricity required by starting said motor, said battery is electrically connected to and charged by said charger;

said charger is electrically connected to said rectifier;

said rectifier is electrically connected to said generator, said motor, and said charger so that electricity from said generator is rectified and delivered to said motor and is stored in said battery via said charger;

said motor spins a first shaft of said flywheel via a first belt connection;

said flywheel is housed and freely spins in a vacuum chamber by said first shaft while said first shaft engages and delivers torque to said generator via a second belt connection, and to said transmission box via a third belt connection, said first shaft is threaded through said casing by two bearings; and said transmission box receives torque from said flywheel and delivers said torque after speed change to said vehicle through a second shaft of said transmission box.

2. The driving device according to claim 1, wherein each of said bearings is one of a hydrostatic bearing, a hydrodynamic bearing, a magnetic levitation bearing, and a non-contact bearing.

* * * * *